June 2, 1925.                    1,540,730
G. DEBENEDETTI
SPRING COVER
Filed June 24, 1924    2 Sheets-Sheet 1
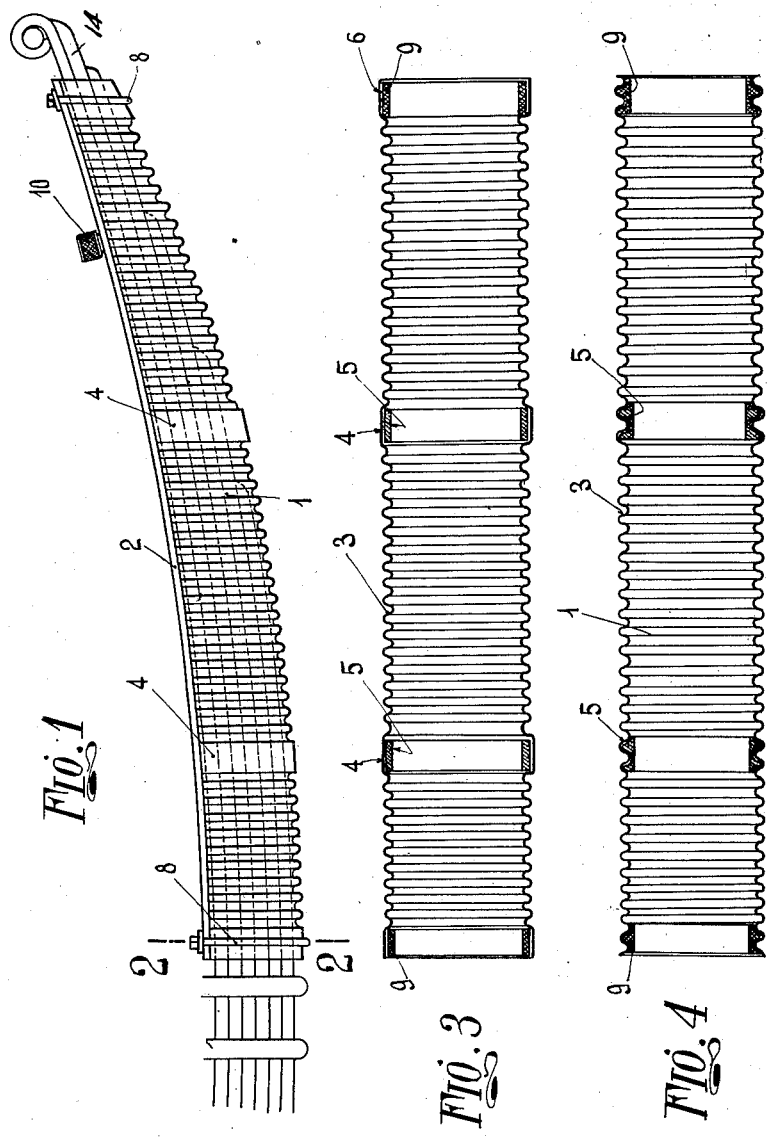
Inventor
G. Debenedetti
by Langner, Parry, Card & Langner
Att'ys.

June 2, 1925.  
G. DEBENEDETTI  
SPRING COVER  
Filed June 24, 1924  
1,540,730  
2 Sheets-Sheet 2
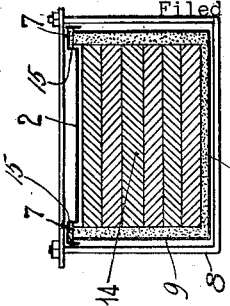
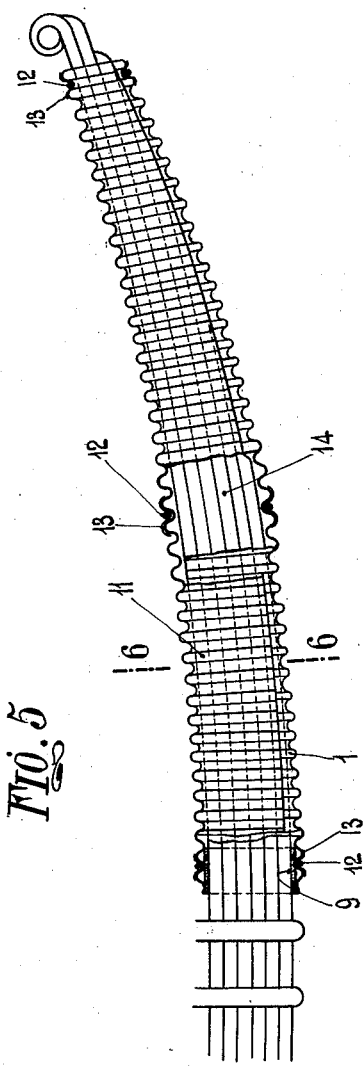
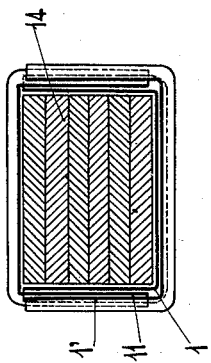
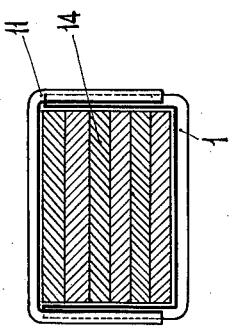
Inventor  
G. Debenedetti Patented June 2, 1925.

1,540,730

UNITED STATES PATENT OFFICE.

GUIDO DEBENEDETTI, OF TURIN, ITALY.

SPRING COVER.

Application filed June 24, 1924. Serial No. 722,146.

*To all whom it may concern:*

Be it known that I, GUIDO DEBENEDETTI, subject of the King of Italy, residing at Turin, Italy, have invented certain new and useful Improvements in Spring Covers, of which the following is a specification.

The present invention relates to covers intended to be arranged on laminated springs of vehicles for the purpose of protecting and lubricating them and it has for its object a cover comprising a casing of plate or sheet material made flexible by transverse corrugations, said casing, when provided with closing means, providing a tight seal receptacle enclosing the spring within it and following the deformations of the same.

The present invention has as a further object to provide means for closing said casing and fastening it on the spring to which it is intended.

On the annexed drawing are shown by way of example embodiments of the present invention and—

Figure 1 is a fragmentary side view of a laminated spring provided with said cover;

Figure 2 is the transverse section of the same on line 2—2 of Figure 1;

Figure 3 is the plan view of an open and empty casing;

Figure 4 is a similar plan view of a modification;

Figure 5 is a side view similar to Figure 1 of another embodiment of the present invention;

Figure 6 is a transverse section on line 6—6 of Figure 5;

Figure 7 is a transverse section similar to Figure 6, of a modification.

In the embodiment illustrated in Figures 1, 2 and 3, the cover comprises a casing 1 of sheet metal having an U-contour in its transverse section and a general shape adapted to enclose within it the spring 14 to be protected, and a top plate 2 intended to close the opening of said casing.

The casing is obtained by folding a sheet metal plate having transverse corrugations 3, the three walls of said casing being thus corrugated in a transverse direction with respect to the axis of the spring leaves and they being flexible to follow the spring movements during the travel of the vehicle.

In the embodiment illustrated in Figures 1–3, in the walls of the casing 1 are provided depressed portions 4 in which are located straps 5 having an U-shape and intended to keep the spring leaves in position, and at the ends of the casing are provided other depressions 6 in which are located packings 9 adapted to be forced on the spring surfaces to prevent both the penetration of foreign matters into the cover and the leakage of the lubricant therefrom.

In the embodiment of Figure 4 the corrugations 3 extend from end to end of the cover and the packings 9 and stirrups 5 are similarly fluted on their outer surfaces.

The closing means 2 may consist, as shown, of a plate 2 having its edges overlying the upper edges of the sides of the casing 1. The said plate 2 has preferably two longitudinal depressed edge grooves 7 adapted to fit on the receptacle sides and enclosing a packing 15 to provide for the required tight joint between the casing sides and said plate.

The casing 1 and the plate 2 are held in position on the spring by means of suitable members, as by way of example belts or straps 8 (Figure 1) clamping them with the intermediate packing 9 on the spring; if desired clamping means may also be located in intermediate points of the cover, to keep the edges of the sides of the receptacle 1 forced on the packings 15 of the edge grooves 7 of the plate 2.

In the embodiment of Figure 4 the cover members are clamped on the spring by means of a metal wire engaged in the recesses of the casing corrugations.

The plate 2 is further provided with a mouth having a removable cap 10 and intended to provide for introducing the lubricant in the cover.

In the embodiment of Figures 5 and 6, the cover consists of a casing 1 having transverse corrugations intended to make it resilient and flexible, and on said casing is located an inverted similar casing 11 which provides for closing the said bottom casing.

The lower casing 1 and the upper casing 11 are clamped together on the spring by means of staples or straps in the same manner as illustrated in Figures 1–3, or they may be fastened in position by means of a wire staple 12, a corrugated band 13 of a material more rigid or more thick than that providing the casings being preferably interposed.

In the embodiment illustrated in Figure 5 the casings 1 and 11 providing the cover are corrugated on their whole extent but they could also include smooth end and intermediate portions, or have smooth end portions for location of packings 9, as illustrated in Figures 1–4.

In any case the upper casing 11, which extends along a more or less large depth over the sides of the casing 1, provides with this latter a sufficient tightness to prevent dust and mud from entering the cover, while it does not affect the flexibility of the cover.

The use of an upper casing having transverse corrugations to provide the closing means has the further advantage that said casing may be easily put in position on springs having different thickness.

Instead of consisting of a transversely corrugated casing providing the bottom portion and of a top casing of similar shape providing closing means, the cover may also consist of three or more casings made flexible by transverse corrugations 1—11—1', said casings being inserted on each other as shown by Figure 7, in a manner to prevent in a quite satisfactory manner the penetration of dust and the leakage of liquid lubricant which is introduced in the cover, said interengaged casings providing in fact a labyrinth seal.

In any case the cover provides a tight receptacle and therefore a satisfactory lubrication of the spring may be produced while the resiliency of the spring is not affected by said cover it being flexible owing to corrugations in its walls.

The described cover may be easily arranged on springs of any kind, is easily adapted to springs having different sizes and has a satisfactory appearance.

What I claim as my invention and desire to secure by United States Letters Patent is:—

1. A cover for laminated springs, comprising, a channel of U-section made of rigid sheet material, said material having corrugations transverse to the axis of the spring laminations, closing means for the mouth of said channel, and means for fastening said closing means to said channel and the entire cover to the spring enclosed therein.

2. A cover for laminated springs, comprising, a channel of U-section made of sheet metal, said channel having corrugations transverse to the axis of the spring laminations, closing means for the mouth of said channel, and means for fastening said closing means to said channel and the entire cover to the spring enclosed therein.

3. A cover for laminated springs, comprising, a channel of U-section made of sheet metal, said channel having corrugations transverse to the axis of the spring laminations, packings at the ends of said channel, closing means for the mouth of said channel, and means for fastening said closing means to said channel and the entire cover to the spring enclosed therein.

4. A cover for laminated springs, comprising, a channel of U-section made of sheet metal, said channel having corrugations transverse to the axis of the spring laminations, flat depressed end portions in the channel, packings in said depressed end portions, closing means for the mouth of said channel, and means for fastening said closing means to said channel and the entire cover to the spring enclosed therein.

5. A cover for laminated springs, comprising, a channel of U-section made of sheet metal, said channel having corrugations transverse to the axis of the spring laminations, flat depressed end portions and flat depressed intermediate portions in the channel, packings in said depressed end portions, and stirrups embracing the spring laminations positioned in said depressed intermediate portions, closing means for the mouth of said channel, and means for fastening said closing means to said channel and the entire cover to the spring enclosed therein.

6. A cover for laminated springs, comprising, a channel of U-section made of sheet metal, said channel having corrugations transverse to the axis of the spring laminations, closing means comprising a second channel of corrugated sheet metal positioned on the mouth of the first named channel, and means for fastening the channels together and for fastening the cover around the spring enclosed therein.

7. A cover for laminated springs, comprising, a channel of U-section made of sheet metal, said channel having corrugations transverse to the axis of the spring laminations, closing means consisting of a second channel of corrugated sheet metal positioned on the mouth of the first named channel, packings between said first named channel and said closing means, and means for fastening together the first named channel and the closing means and for fastening the cover around the spring enclosed therein.

8. A cover for laminated springs, comprising, a channel of U-section made of sheet metal, said channel having corrugations transverse to the axis of the spring laminations, closing means comprising a second channel of corrugated sheet metal positioned on the mouth of the first named channel, packings positioned between the first named channel and said closing means and also at the ends of the cover, and means for fastening together the members forming said cover and for fastening said cover around the spring enclosed therein.

9. A cover for laminated springs, comprising, a channel of U-section made of sheet metal, said channel having corrugations transverse to the axis of the spring laminations, other channels formed of corrugated sheet metal and reversely arranged on each other so as to enclose the spring on all sides, and means for fastening said channels to each other and to the spring enclosed therein.

In testimony whereof I have signed my name to this specification.

GUIDO DEBENEDETTI.